United States Patent
Koehler

(10) Patent No.: US 8,218,343 B2
(45) Date of Patent: Jul. 10, 2012

(54) DC POLARITY CONVERTER AND DC PARALLEL TOPOLOGY, AND METHODS

(75) Inventor: Bill Koehler, Saylorsburg, PA (US)

(73) Assignee: Roal Electronics S.p.A. (IT)

( * ) Notice: Subject to any disclaimer, the term of this patent is extended or adjusted under 35 U.S.C. 154(b) by 634 days.

(21) Appl. No.: 12/404,229

(22) Filed: Mar. 13, 2009

(65) Prior Publication Data

US 2010/0231192 A1 Sep. 16, 2010

(51) Int. Cl.
*H02M 7/00* (2006.01)
*H02M 1/10* (2006.01)
(52) U.S. Cl. .................................. 363/65; 363/142
(58) Field of Classification Search .............. 363/65–72, 363/142
See application file for complete search history.

(56) References Cited

U.S. PATENT DOCUMENTS

| | | | |
|---|---|---|---|
| 3,273,039 A | 9/1966 | Godshalk | |
| 3,413,487 A | 11/1968 | Gershen | |
| 4,374,306 A | 2/1983 | Lohr | |
| 4,473,757 A | 9/1984 | Farago | |
| 4,819,147 A | 4/1989 | Bingham | |
| 4,994,727 A | 2/1991 | Yang | |
| 5,189,359 A | 2/1993 | Kronberg | |
| 5,510,972 A | 4/1996 | Wong | |
| 5,872,708 A | 2/1999 | Park | |
| 5,982,652 A * | 11/1999 | Simonelli et al. | 363/142 |
| 6,153,980 A | 11/2000 | Marshall | |
| 6,181,588 B1 * | 1/2001 | Kates et al. | 363/126 |

* cited by examiner

*Primary Examiner* — Jessica Han
(74) *Attorney, Agent, or Firm* — Merle W. Richman, Esq.

(57) ABSTRACT

Embodiments of DC power related systems and methods including a topology and devices to enable DC powered or driven constant current devices to be connected in a parallel configuration while maintaining a series connection internal to the devices.

30 Claims, 7 Drawing Sheets

14A

US 8,218,343 B2

DC POLARITY CONVERTER AND DC PARALLEL TOPOLOGY, AND METHODS

TECHNICAL FIELD

Various embodiments described herein relate to direct current (DC) topologies having an AC or DC source and related devices.

BACKGROUND INFORMATION

In order to reduce wiring costs and ease installation it may be desirable to connect one or more DC powered or driven devices in a series string that is powered from a single source. The present invention provides a topology and devices to enable DC powered or driven constant current devices to be connected in a parallel configuration while maintaining a series connection internal to the devices.

DETAILED DESCRIPTION

Figure 1:
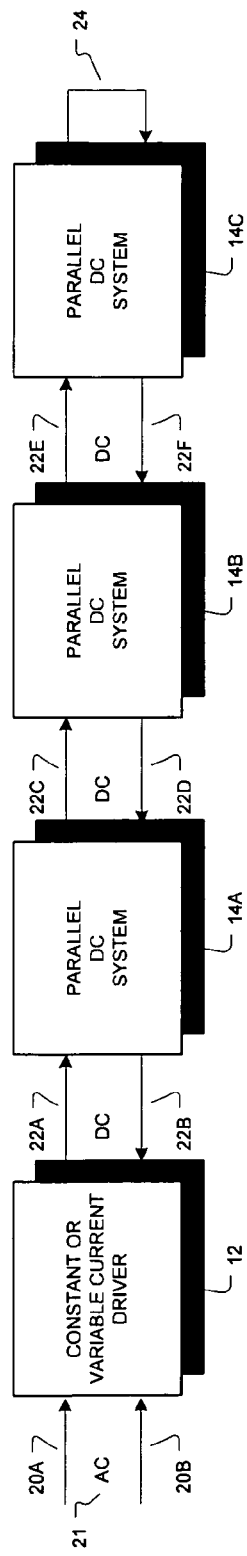
FIG. 1 is a block diagram of a parallel coupled DC driven systems architecture according to various embodiments.

FIG. 1 is a block diagram of AC or DC powered topology-DC output architecture 10 that includes several parallel DC systems 14A, 14B, 14C and a constant or variable direct current (DC) driver 12. In an embodiment each parallel DC system 14A, 14B, 14C may be electrically coupled in parallel to the constant or variable DC driver 12. The power source 21 may provide alternating current (AC) power or DC power to the constant or variable DC driver 12 via lines 20A, 20B. The driver 12 may provide the first DC device 14A direct current power via lines 22A, 22B.

In an embodiment each parallel DC system may provide DC power to a coupled DC driven device 60 (FIG. 2) and two lines 22C, 22D where another parallel DC system 14B, 14C or final feedback loop 24 (FIG. 1) may be coupled to the lines 22C, 22D. The parallel DC systems 14A, 14B, 14C create a serial coupling between each respective DC driven device 60 while having a user perceived parallel coupling, 22C, 22D, 22E, 22F where lines 22A, 22C, 22E provide a serial path between respective DC driven device 60 (for each system 14A, 14B, 14C) and line 24, 22F, 22D, and 22B complete the serial path to the DC driver 12.

Figure 3:
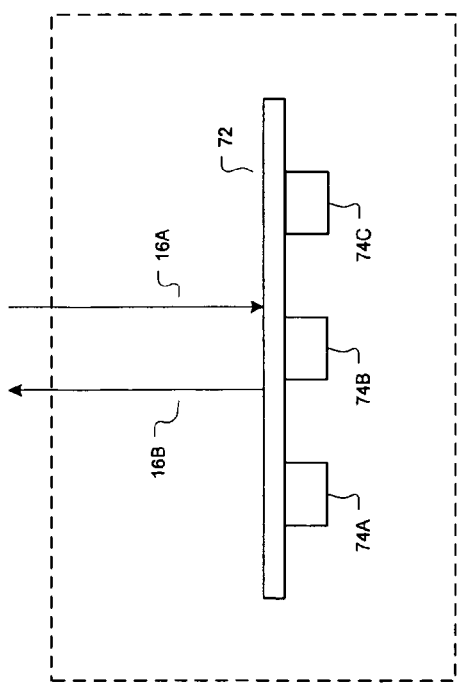
FIG. 3 is a block diagram of a DC driven or powered device or fixture according to various embodiments.

In an embodiment a DC driven device 60 may be a solid state lighting (SSL) fixture 70 (FIG. 3). The SSL fixture 70 may include one or more Light Emitting Diodes (LED) 74A, 74B, 74C, electro-luminance (EL), or other low voltage DC lighting device. An LED fixture may include an LED lighting strip, lighting tile, lighting unit, module, array, channel letter sign kit, channel light, border light kit, channel letter lighting system, border tube kit, Class 2 lighting system, Class 2 lighting assembly, Class 2 lighting strip, Class 2 illumination module, or Class 2 fixture.

In an embodiment the DC driver 12 may be an alternating current (AC) to DC converter. The DC driver 12 may receive the AC signal 21 and generate a constant DC current-limited, a constant voltage-limited signal, or a power-limited DC signal on lines 22A, 22B for one or more parallel DC systems 14A, 14B, 14C. In an embodiment the DC driver 12 circuitry may generate a Class 1 signal or Class 2 signal as defined by the National Electric Code (NEC) Article 725.

As defined by the NEC, Article 725, a Class 1 limited-power source circuit is limited to 30 volts and 1,000 volt-amperes and a Class 2 limited-power source circuit is limited to 30 volts, 100 volt-amperes, and 8 amperes. It is noted that Class 2 circuits are not considered a danger to personnel and may not require an electrician to install wiring between Class 2 limited-power source circuit and a device, e.g., parallel DC systems 14A, 14B, 14C as a function of the DC driver 12 classification.

In an embodiment the DC driver 12 may be at large distance from the first parallel DC system 14A, up to a first maximum predetermined distance apart. Similarly a parallel DC system 14A, 14B, 14C may be located at large distance from the next parallel DC system 14A, 14B, 14C, in an embodiment up to a second, shorter maximum predetermined distance apart. Accordingly a first parallel DC system 14A, 14B, 14C may be located at a central location relative to other parallel DC systems 14A, 14B, 14C and the DC driver 12. The DC driver 12 may also conform to other standards. In an embodiment the DC driver 12 maximum volt-amperes output level may be at least twice a parallel DC system 14A, 14B, 14C maximum volt-amperes output level.

Figure 2:
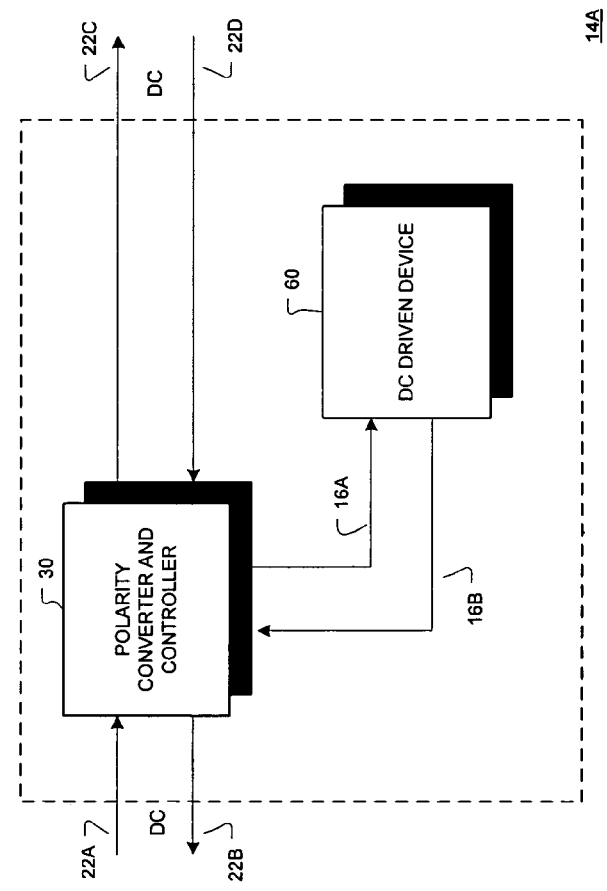
FIG. 2 is a block diagram of a parallel DC system according to various embodiments.

FIG. 2 is a block diagram of a parallel DC system 14A, 14B, 14C according to various embodiments. The system 14A, 14B, 14C may include a polarity converter and controller 30 and a DC power driven device 60. The polarity converter and controller 30 may receive a positive DC signal on either 22A, 22B and couples the power to line 22C, 22D. The polarity converter and controller 30 may feed the DC signal to the DC power driven device 60 via lines 16A and 16B and ensures that the polarity is in the proper direction, regardless of the input power polarity. The polarity converter and controller 30 may also include an open circuit detector 50 (FIG. 4) where the open circuit detector 50 may bypass the DC power driven device 60 when an open circuit is detected.

In an embodiment the polarity converter and controller 30 may enable a parallel DC system user or installer to connect either 22C or 22D to either connection of a parallel DC system 14B. In such an embodiment the parallel DC system 14A, 14B, 14C may be coupled by an installer or user without polarity consideration or determination similar to common AC power driven devices or apparatus. The open circuit detector 50 ensures that a DC power driven device 60 failure in a parallel DC system 14A, 14B, 14C of architecture 10 does not cause other parallel DC systems 14A, 14B, 14C to be effected.

FIG. 3 is a block diagram of a DC driven or powered device or fixture 70 according to various embodiments. The fixture 70 may be a solid state lighting (SSL) fixture 70. The SSL fixture 70 includes Light Emitting Diodes (LED) 74A, 74B, 74C and a printed circuit board (PCB) 72. The LEDs 74A, 74B, 74C may be electrically coupled to the PCB 72. The PCB 72 may receive a DC power signal on lines 16A, 16B and supply a conditioned signal to each LED 74A, 74B, 74C. The SSL fixture 70 may include an LED lighting strip, lighting tile, lighting unit, module, array, channel letter sign kit, channel light, border light kit, channel letter lighting system, border tube kit, Class 2 lighting system, Class 2 lighting assembly, Class 2 lighting strip, Class 2 illumination module, or Class 2 fixture.

Figure 4:
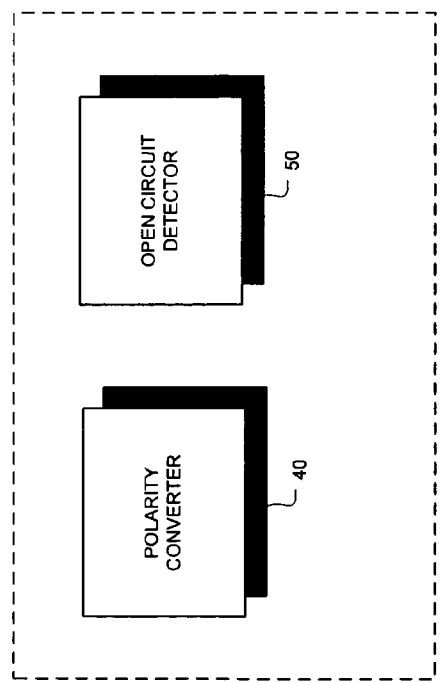
FIG. 4 is a block diagram of a parallel DC power system interface according to various embodiments.

FIG. 4 is a block diagram of a parallel polarity converter and controller 30 according to various embodiments. The polarity converter and controller 30 may include a polarity converter or module 40 and an open circuit detector or module 50. The polarity converter 40 may switch or change the polarity of a received DC signal as necessary. The polarity converter 40 may receive a positive DC signal on either 22A, 22B and ensure that the proper polarity DC signal is coupled to the DC power driven device 60 via lines 16A and 16B. The polarity converter 40 may feed the DC signal to lines 22C, 22D for connection to another parallel DC system, 14A, 14B, 14C. The open circuit detector 50 may bypass a coupled DC power driven device 60 when an open circuit is detected.

Figure 5:
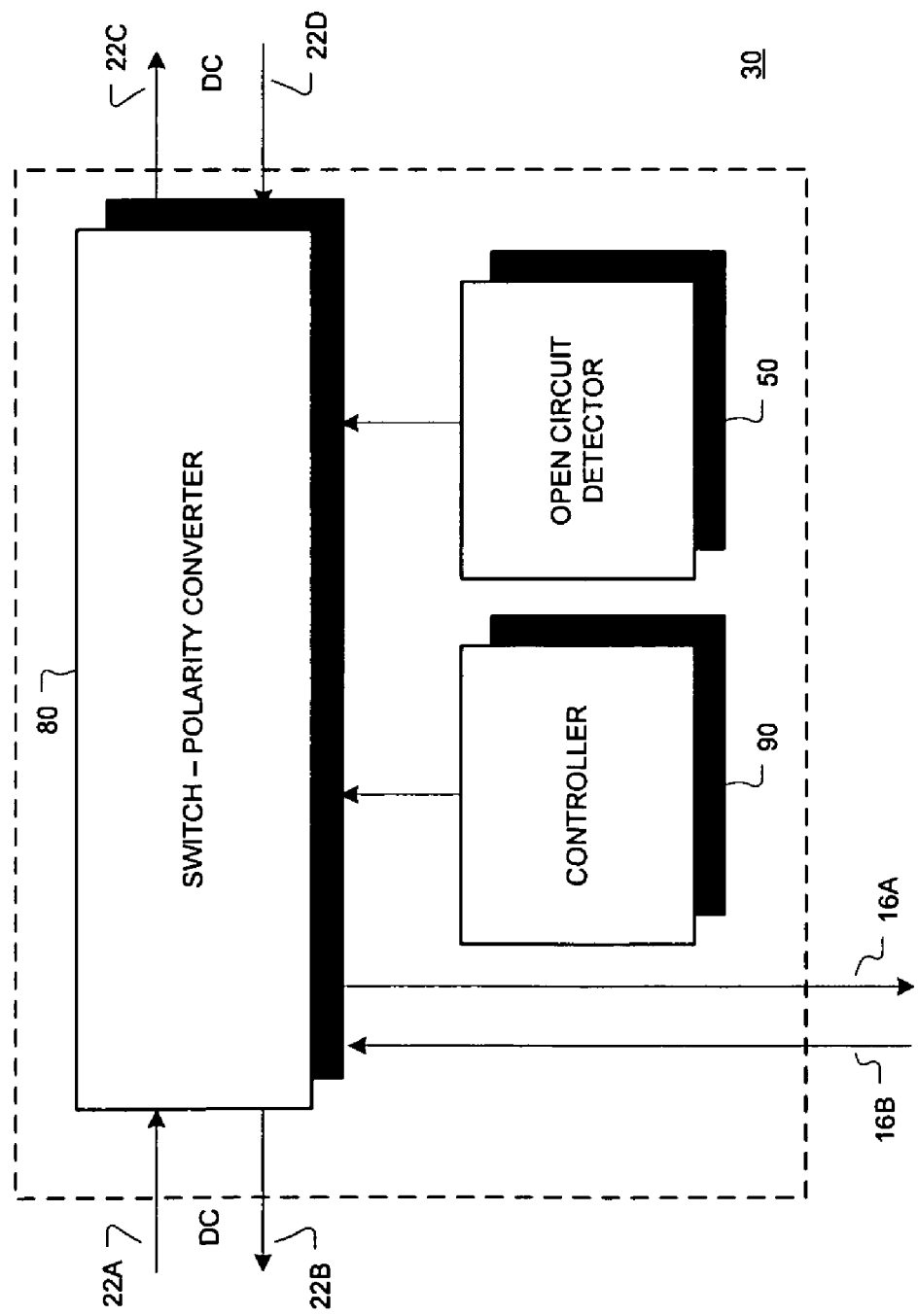
FIG. 5 is a block diagram of a parallel DC power system interface according to various embodiments.

FIG. 5 is a block diagram of a polarity converter and controller 30 according to various embodiments. The polarity converter and controller 30 may include a switch-polarity converter or module 80, a controller 90, and an open circuit detector or module 50. The controller 90 may determine whether the polarity is reversed and direct the operation of one or more switches of the switch—polarity converter 80 accordingly. The switch-polarity converter 80 may switch or change the polarity of a received DC signal as directed by the controller 90. The switch-polarity converter 80 may receive a positive DC signal on either 22A, 22B and ensure that the proper polarity DC signal is coupled to the DC power driven device 60 via lines 16A and 16B. The switch-polarity converter 80 may feed the DC signal to lines 22C, 22D for connection to another parallel DC system, 14A, 14B, 14C. The open circuit detector 50 may bypass a coupled DC power driven device 60 when an open circuit is detected.

Figure 6:
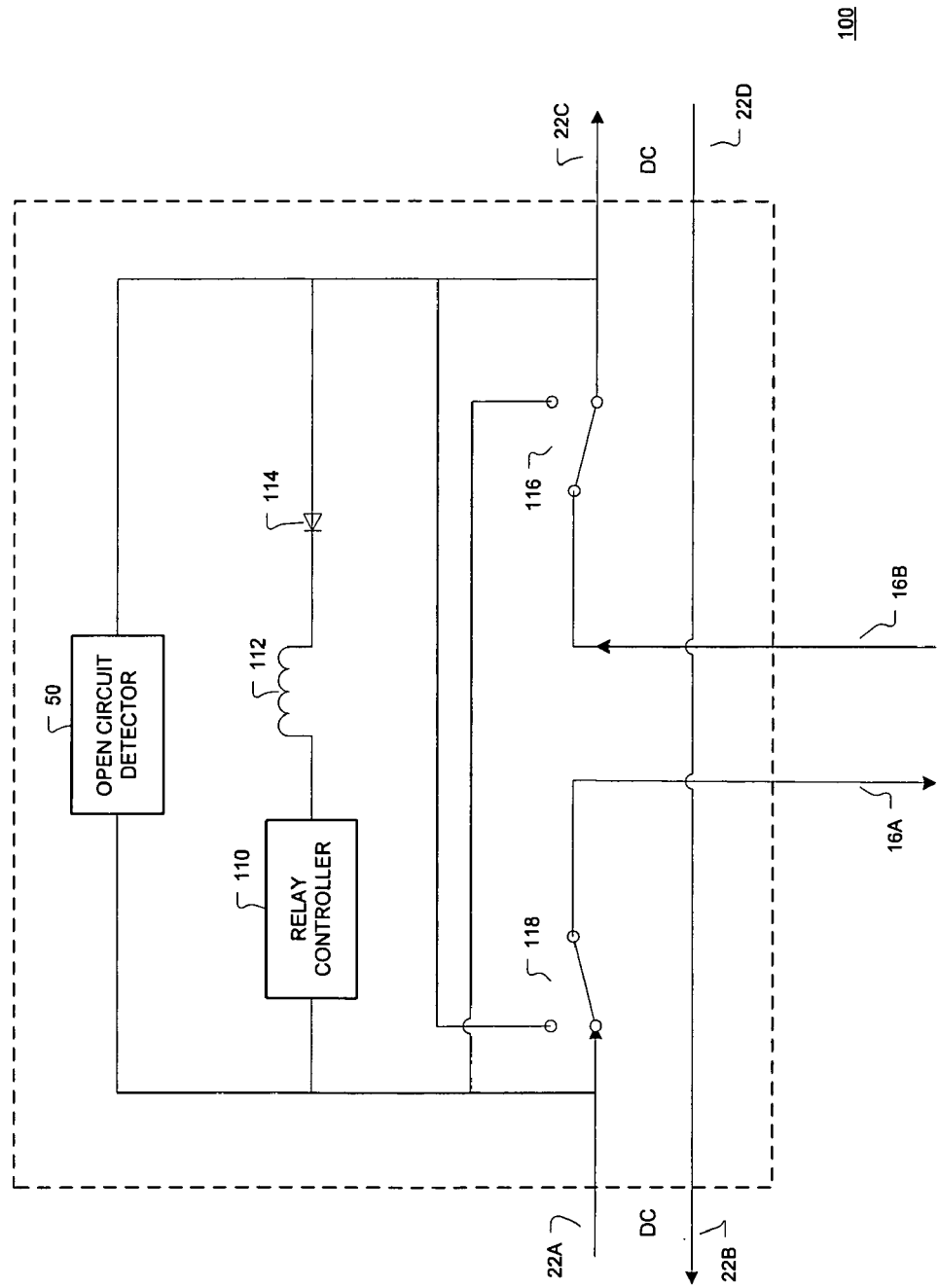
FIG. 6 is a block diagram of another parallel DC power system interface according to various embodiments.

FIG. 6 is a block diagram of another parallel DC power interface 100 according to various embodiments. As shown in FIG. 6 the interface 100 includes a relay coil, 112 with two sets of contacts, 116, 118, a relay controller 110, a diode 114, and an open circuit detector 50. In operation the open circuit detector 50 is normally open unless an open circuit is detected across lines 16A, 16B and then the open circuit detector 50 forms a signal path between 22A and 22C to bypass lines 16A, 16B.

In an embodiment the relay contacts 116, 118 are double pole-double throw contacts and are shown in a normally closed state where a positive DC signal is provided to line 22A and passed to a device 60 via lines 16A, 16B and then to 22C when the device 60 is not open circuited. In such a state a voltage developed across a device 60 coupled to lines 16A, 16B, and through the normally closed contacts of 116, 118 is applied to the open circuit detector module 50 and across the series string of the diode 114, relay coil 112, and relay controller module 110.

When the polarity of an applied voltage provides a positive polarity DC signal on line 22A the diode 114 is reverse biased and accordingly no voltage is developed across the relay coil 112. In such a condition and in an embodiment relay contacts 116, 118 remain in their normally closed state (since the relay coil 112 is not energized). Accordingly, current may flow from line 22A through the normally closed relay 118 contact, to a DC device coupled to lines 16A, 16B, through the normally closed relay contact 116 and to line 22C. For the last parallel DC device 14A, 14B, 14C, a jumper 24 (FIG. 1) may be coupled to lines 22C, 22D. In such an embodiment current may be returned to input line 22B to complete a circuit.

In the condition where a negative DC signal is applied at input terminal or line 22A with respect to input terminal or line 22B, diode 114 may be forward biased and the relay coil 112 may be energized. In an embodiment the relay contacts 118, 116 may switch to the normally open position. In this manner, the positive DC signal becomes connected from input line 22B, through the line 22D and through a jumper 24 (at the last parallel DC device 14C) to line or terminal 22C. In such an embodiment the positive DC voltage is connected to the normally open position of contacts 118 to line 16A and to the anode of a device 60 coupled to line 16A, 16B. The current may propagate through the device 60, and the normally open position of contacts 116 via line 16B back to the input line or terminal 22A. Accordingly the interface 100 may ensure that a DC voltage of the appropriate polarity is always applied to a device 60 connected to lines 16A, 16B.

In the interface 100 embodiment when a desired polarity DC voltage is applied to lines 22A, 22B, a reverse DC voltage condition may never exist across lines 16A, 16B since the normally closed contacts of 116, 118 are connected. When a reverse polarity DC signal is applied to lines 22A, 22B, the relay coil 112 needs to energize before the contacts 116, 118 switch to the normally open position and apply the correct polarity across lines 16A, 16B. The relay coil 112 may energize in about or less than 20 ms. During this time, the polarity of the connection to lines 16A, 16B may not be correct. Once the relay is energized and the contacts have changed state, the correct voltage will be applied to lines 16A, 16B. Also the relay coil (when energized) reduces the current applied to a device 60 on lines 16A, 16B. In an embodiment a balancing load may be added to the interface 1000 to provide a constant load regardless of the applied polarity. Further as the device's 60 load or resistance changes, the relay coil 112 resistance may also change. The interface 100 may also have losses on the order of 0.3 W and an efficiency of about 97% for a 10 watt device 60.

Figure 7:
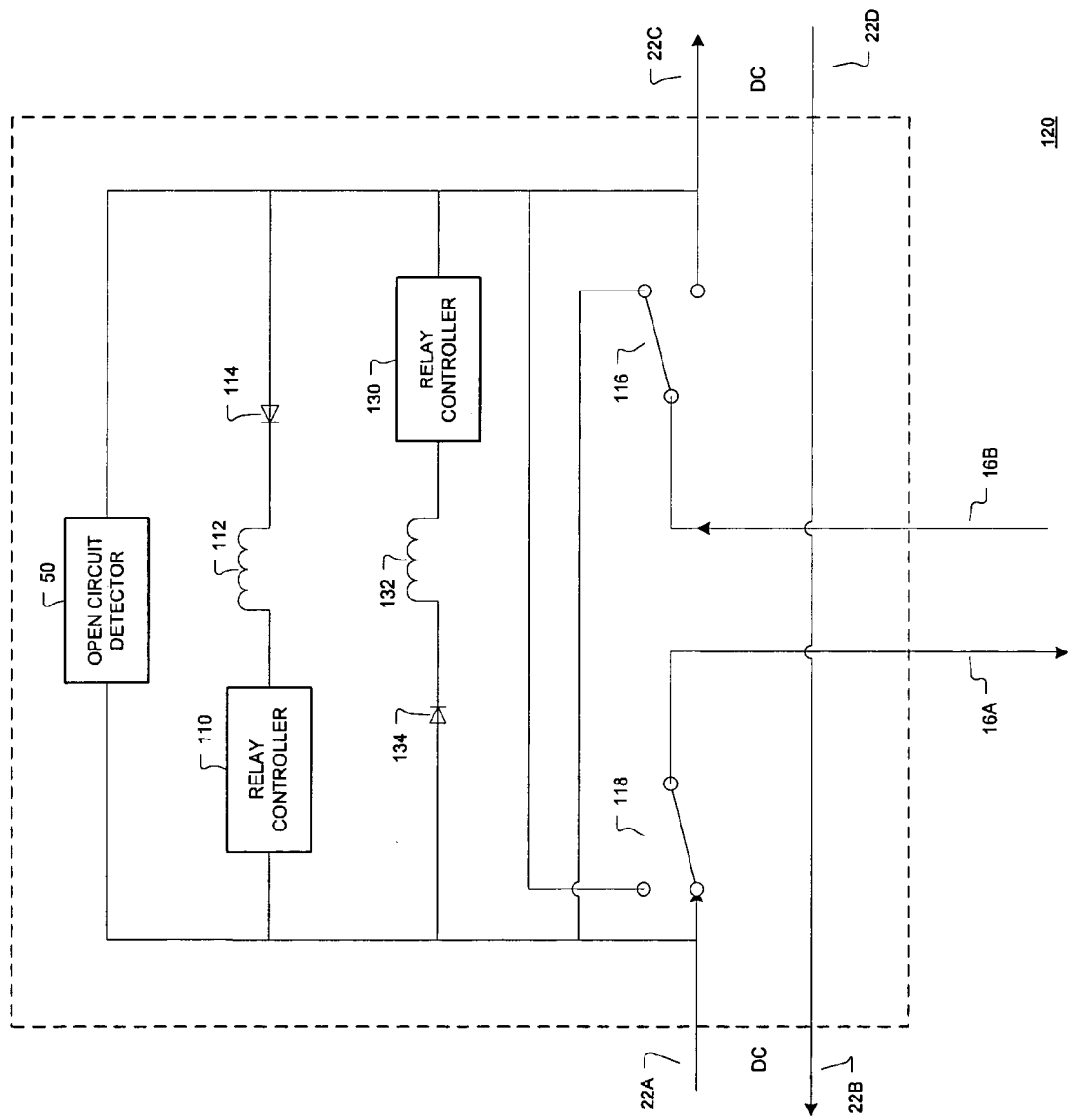
FIG. 7 is a block diagram of another parallel DC power system interface according to various embodiments.

FIG. 7 is a block diagram of another parallel DC power interface 120 according to various embodiments. As shown in FIG. 7 the interface 120 includes a relay 112 with a single set of contacts 118, a relay controller 110, a diode 114, a second relay 132 with a single set of contacts 116, a second relay controller 130, a second diode 134, and an open circuit detector 50. In operation the open circuit detector 50 is normally open unless an open circuit is detected across lines 16A, 16B and then the open circuit detector 50 forms a signal path between 22A and 22B to bypass lines 16A, 16B. Interface 120 operates similarly to interface 100 in an embodiment but further includes the second relay controller 130, the second diode 134, the second relay 132, with the contacts 116 connected to the normally open position. Accordingly, either the relay coil 112 or relay coil 132 will energize to complete a circuit as a function of the applied DC voltage signal polarity applied to lines 22A, 22B.

Interface 120 may not apply a reverse polarity signal to a device 60 coupled to lines 16A, 16B due to the additional relay coil 132 and the connection to the normally open contact 116. In the interface 120 embodiment a balancing load is not needed since a relay coil 112 or relay coil 132 will always be energized. As the device's 60 load or resistance changes, the relay coil 112 or 132 resistance may also change. The interface 70 may also have losses on the order of 0.3 W and an efficiency of about 97% for a 10 watt device 60.

Figure 8:
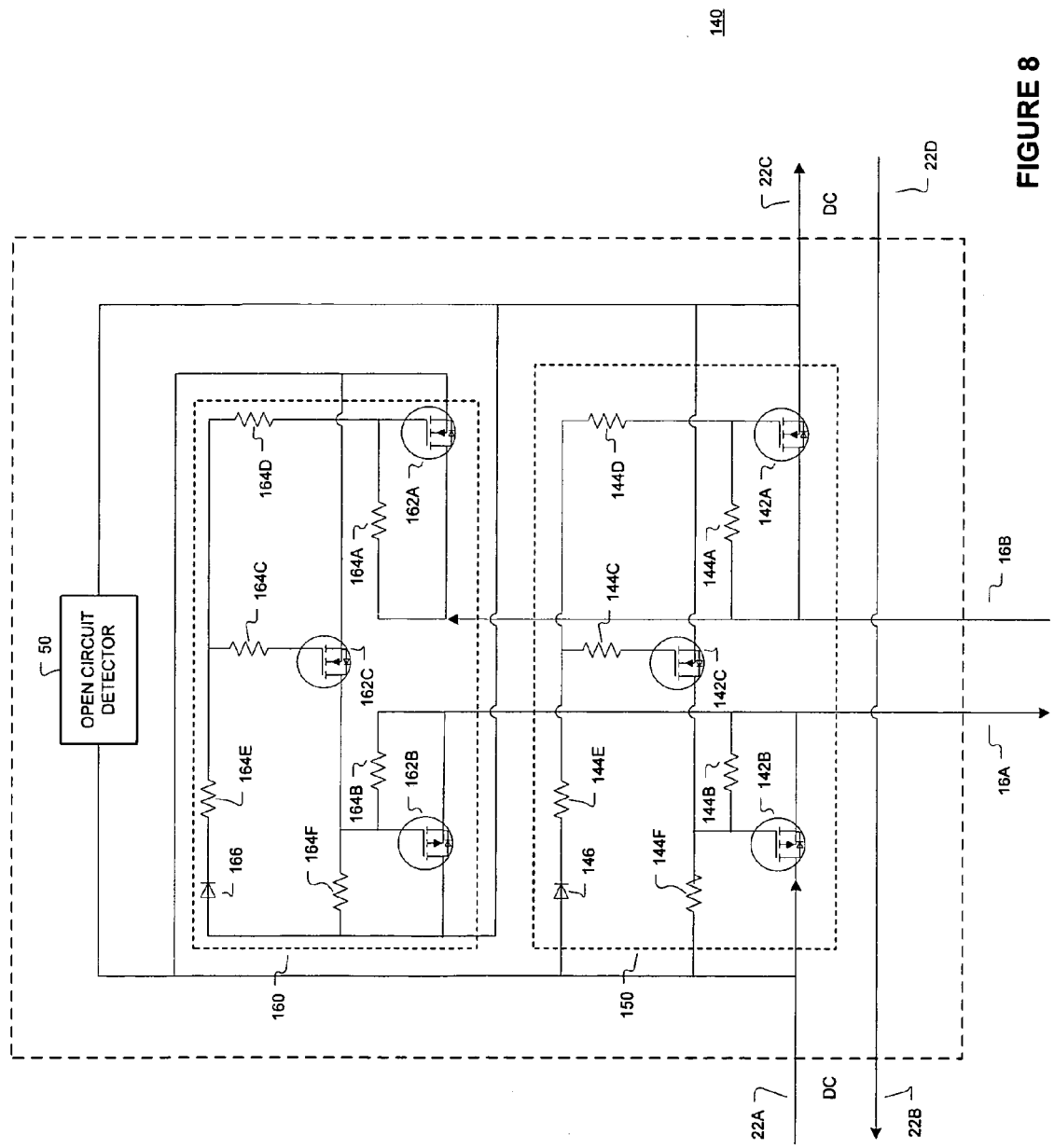
FIG. 8 is a block diagram of another parallel DC power system interface according to various embodiments.

FIG. 8 is a block diagram of another parallel DC power interface 140 according to various embodiments. The interface 140 includes an open circuit detector 50, first switching circuit 150, and second switching circuit 160. The circuit 150 performs the effective function of relay 118, relay coil 112, and diode 114 and circuit 160 performs the effective function of relay 116, relay coil 132, and diode 134. The circuit 150 includes three MOSFETs 142A, 142B, 142C, a diode 146, and several resistors 144A to 144E. The circuit 160 also includes three MOSFETs 162A, 162B, 162C, a diode 166, and several resistors 164A to 164E. The interface 140 has insignificant current loses compared to interfaces 100, 120.

Similar to interface 120, for the last parallel DC device 14A, 14B, 14C, a jumper 24 (FIG. 1) may be coupled to lines 22C, 22D. In such an embodiment current may be returned to input line 22B to complete a circuit when the polarity of an applied voltage provides a positive polarity DC signal on line 22A. In an embodiment the interface 140 a first switch element 150 includes an N channel MOSFET 142A with a body diode and a P channel MOSFET 142B with a body diode connected in series with a device 60 coupled to lines 16A, 16B. The MOSFETs 142A, 142B body diodes may conduct and permit current to flow into the device 60 when the MOSFETS 142A, 142B are not operating.

In an embodiment current may pass from input terminal or line 22A through the P channel MOSFET 142B body diode, through a device 60 coupled to lines 16A, 16B, to the N channel MOSFET 142A body diode and returning through terminal or line 22C. The developed or applied voltage may generate a voltage across the gate and source of the N channel MOSFET 142A and turns on the MOSFET 142A. At the same time, the gate of the N channel MOSFET 142C may be turned on, which may apply a voltage potential to the gate of the P channel MOSFET 142B. In an embodiment, MOSFET 142A, 142C, and 142B may then operate when a positive bias DC signal is applied to lines 22A, 22B. Similarly when the applied voltage bias at lines 22A, 22B is negative, the circuit 160 may operate in the same manner as circuit 150.

In an embodiment the MOSFETs 142, 162 may be replaced by Bipolar transistors in place of MOSFET devices in this design but will yield higher losses and lower operating efficiencies. In addition each MOSFET may be replaced by a series connection of two MOSFETS. Such an embodiment may increase operating losses but may provide additional device 60 protection.

Figure 9A:
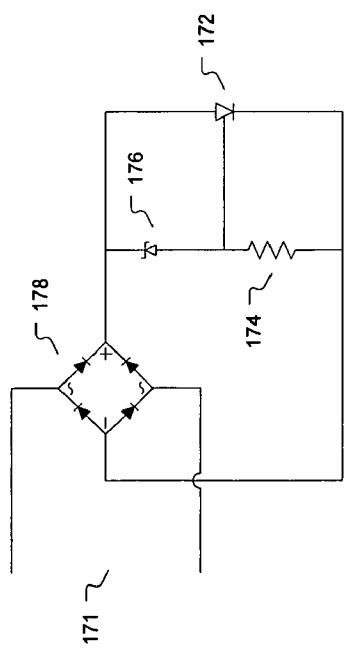
FIG. 9A is a block diagram of an open circuit detector according to various embodiments.
Figure 9B:
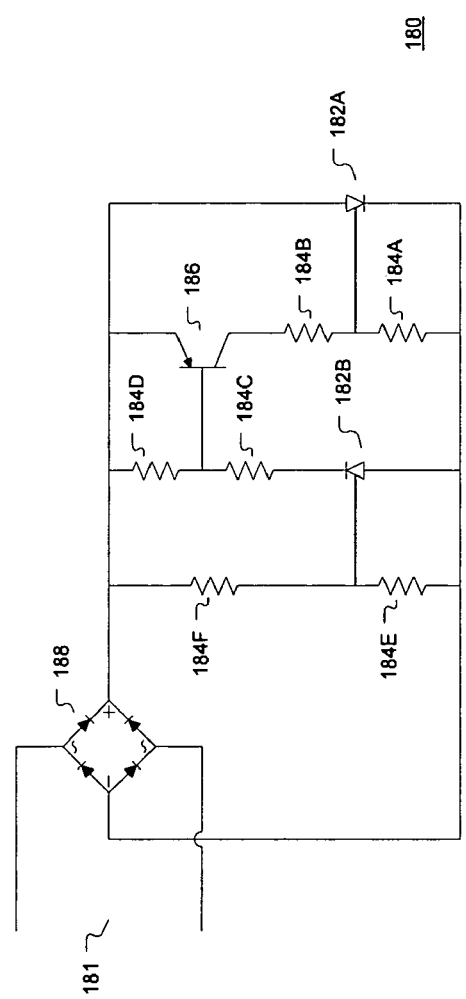
FIG. 9B is a block diagram of another open circuit detector according to various embodiments.

FIGS. 9A and 9B are block diagrams of open circuit detectors 170, 180 according to various embodiments. The detector 170, 180 may enable devices 60 connected to other parallel DC systems 14A, 14B, 14C to operate when another device 60 of a parallel DC systems 14A, 14B, 14C is open circuited. In an embodiment an open circuit voltage detector 170, 180 may be a crowbar overvoltage detector. Further, the quiescent current of the open circuit voltage detection 170, 180 may be ideally low in an embodiment.

As shown in FIG. 9A the open circuit detector 170 may include a rectifier bridge 178, a Silicon Controlled Rectifier (SCR) 172, a resistor 174, and a breakdown diode 176. The open circuit detector 180 may include a rectifier bridge 188, Silicon Controlled Rectifier (SCR) 182A, voltage reference diode 182B, resistors 184A to 184F, and a PNP transistor 186.

The modules may include hardware circuits, single- or multi-processor circuits, memory circuits, software program modules and objects, firmware, and combinations thereof, as desired by the architect of the parallel DC system 14A, 14B, 14C and as appropriate for particular implementations of various embodiments. The apparatus and systems of various embodiments may be useful in applications other than generating DC signals. They are not intended to serve as a complete description of all the elements and features of apparatus and systems that might make use of the structures described herein. Although the inventive concept may include embodiments described in the exemplary context of one or more electrical standards, the claims are not so limited. Additional information regarding the NEC standards and other electrical standards may be found in common literature available to one of skill in the art.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A direct current (DC) power module, including:
    a DC power input signal terminal pair to receive a DC power signal of unknown polarity from a physically separate first module via a first wire pair;
    a DC power output signal terminal pair to provide a DC power signal of a known polarity to a physically separate direct current power module via a second wire pair;
    a DC powered device; and
    a polarity converter module coupled to the DC power input signal pair, the DC powered device, and the DC power output signal pair, the module converting the polarity of the received unknown polarity DC signal to a known polarity DC signal and providing the known polarity DC signal serially first to the DC powered device and second to the DC power output signal terminal pair.

2. The DC power module of claim 1, further comprising an open circuit detector module coupled to the DC powered device and the DC power out signal terminal pair, the open circuit detector module bypassing power to the DC powered device when the DC powered device is an open circuit.

3. The DC power module of claim 2, wherein the DC powered device is a class 2 device and the first wire pair and the second wiring pair are class 2 wiring pairs.

4. The DC power module of claim 3, wherein the DC powered device includes a DC powered class 2 solid state lighting (SSL) element and the SSL element includes a printed circuit board (PCB), the PCB coupled to the polarity converter module.

5. The DC power module of claim 4, wherein a light emitting diode (LED) is coupled to the PCB.

6. The DC power module of claim 4, wherein the SSL includes a light emitting diode (LED).

7. The DC power module of claim 2, wherein the polarity converter module includes at least a two position relay.

8. The DC power module of claim 2, wherein the polarity converter module includes an electronic switch.

9. The DC power module of claim 8, wherein the electronic switch includes a MOSFET.

10. The DC power module of claim 8, wherein the electronic switch includes a plurality of bipolar transistors.

11. A direct current (DC) power system, including:
an AC to DC power converter coupled to an AC power source, the DC power converter converting the AC power source to a DC power signal and providing the DC power signal on a pair of polarized terminals;
a plurality of physically separate DC powered modules, each module including:
a DC power input signal terminal pair to receive a DC power signal of unknown polarity;
a DC power output signal terminal pair to provide a DC power signal of a known polarity;
a DC powered device; and
a polarity converter module coupled to the DC power input signal pair, the DC powered device, and the DC power output signal pair, the module converting the polarity of the received unknown polarity DC signal to a known polarity DC signal and providing the known polarity DC signal serially first to the DC powered device and second to the DC power output signal terminal pair; and
at least a first wire pair coupling the power converter terminal pair to one of the DC powered module input signal terminal pair;
at least a second wire pair coupling the one of the DC powered module output signal terminal pair to another of the DC powered modules input signal terminal pair; and
a feedback line coupling the DC power output signal terminal pair of one of the plurality of DC powered modules, the plurality of DC powered modules forming a series coupling between the AC to DC power converter and respective DC powered devices of the plurality of DC powered modules.

12. The DC power system of claim 11, each module further comprising an open circuit detector module coupled to the DC powered device and the DC power out signal terminal pair, the open circuit detector module bypassing power to the DC powered device when the DC powered device is an open circuit.

13. The DC power system of claim 12, wherein each DC powered device is a class 2 device and the first wire pair and the second wiring pair are class 2 wiring pairs.

14. The DC power system of claim 13, wherein each DC powered device includes a DC powered class 2 solid state lighting (SSL) element and the SSL element includes a printed circuit board (PCB), the PCB coupled to a polarity converter module.

15. The DC power system of claim 14, wherein a light emitting diode (LED) is coupled to the PCB.

16. The DC power system of claim 14, wherein the SSL includes a light emitting diode (LED).

17. The DC power system of claim 12, wherein each polarity converter module includes at least a two position relay.

18. The DC power system of claim 12, wherein each polarity converter module includes an electronic switch.

19. The DC power module of claim 18, wherein the electronic switch includes a MOSFET.

20. The DC power module of claim 18, wherein the electronic switch includes a plurality of bipolar transistors.

21. The DC power module of claim 12, wherein the AC to DC power converter is one of a variable DC current source and a constant DC current source.

22. A method of creating a direct current (DC) power system, including:
providing an AC to DC power converter coupled to an AC power source, the DC power converter converting the AC power source to a DC power signal and providing the DC power signal on a pair of polarized terminals;
providing a plurality of physically separate DC powered modules, each module including:
a DC power input signal terminal pair to receive a DC power signal of unknown polarity;
a DC power output signal terminal pair to provide a DC power signal of a known polarity;
a DC powered device; and
a polarity converter module coupled to the DC power input signal pair, the DC powered device, and the DC power output signal pair, the module converting the polarity of the received unknown polarity DC signal to a known polarity DC signal and providing the known polarity DC signal serially first to the DC powered device and second to the DC power output signal terminal pair; and
at least a first wire pair coupling the power converter terminal pair to one of the DC powered module input signal terminal pair;
at least a second wire pair coupling the one of the DC powered module output signal terminal pair to another of the DC powered modules input signal terminal pair; and
providing a feedback line coupling the DC power output signal terminal pair of one the plurality of DC powered modules, the plurality of DC powered modules forming a series coupling between the AC to DC power converter and respective DC powered devices of the plurality of DC powered modules.

23. The DC power method of claim 22, each module further comprising an open circuit detector module coupled to the DC powered device and the DC power out signal terminal pair, the open circuit detector module bypassing power to the DC powered device when the DC powered device is an open circuit.

24. The DC power method of claim 23, wherein each DC powered device is a class 2 device and the first wire pair and the second wiring pair are class 2 wiring pairs.

25. The DC power method of claim 24, wherein each DC powered device includes a DC powered class 2 solid state lighting (SSL) element and the SSL element includes a printed circuit board (PCB), the PCB coupled to a polarity converter module.

26. The DC power method of claim 25, wherein a light emitting diode (LED) is coupled to the PCB.

27. The DC power method of claim 25, wherein the SSL includes a light emitting diode (LED).

28. The DC power method of claim 23, wherein each polarity converter module includes at least a two position relay.

29. The DC power method of claim 23, wherein each polarity converter module includes an electronic switch.

30. The DC power method of claim 23, wherein the AC to DC power converter is a constant or variable DC current source.

* * * * *